United States Patent
Sfarti et al.

(10) Patent No.: US 8,412,916 B2
(45) Date of Patent: *Apr. 2, 2013

(54) COMPUTING SYSTEM HAVING CPU AND BRIDGE OPERATING USING CPU FREQUENCY

(75) Inventors: Adrian Sfarti, Cupertino, CA (US); Korbin Van Dyke, Sunol, CA (US); Michael Frank, Sunnyvale, CA (US); Arkadi Avrukin, Pleasanton, CA (US)

(73) Assignee: ATI Technologies ULC, Markham, Ontario (CA)

( * ) Notice: Subject to any disclaimer, the term of this patent is extended or adjusted under 35 U.S.C. 154(b) by 560 days.

This patent is subject to a terminal disclaimer.

(21) Appl. No.: 12/822,258

(22) Filed: Jun. 24, 2010

(65) Prior Publication Data
US 2010/0262746 A1 Oct. 14, 2010

Related U.S. Application Data

(63) Continuation of application No. 09/471,877, filed on Dec. 23, 1999, now Pat. No. 7,769,988.

(51) Int. Cl.
*G06F 15/00* (2006.01)
*G06F 15/76* (2006.01)
(52) U.S. Cl. ........................................ 712/32
(58) Field of Classification Search ............... 712/32
See application file for complete search history.

(56) References Cited

U.S. PATENT DOCUMENTS

| | | | |
|---|---|---|---|
| 4,152,764 A | 5/1979 | Connors et al. | |
| 5,826,093 A | 10/1998 | Assouad et al. | |
| 5,845,329 A | 12/1998 | Onishi et al. | |
| 5,909,559 A | 6/1999 | So | |
| 5,974,239 A | 10/1999 | Klein | |
| 5,991,833 A | 11/1999 | Wandler et al. | |
| 6,023,587 A | 2/2000 | Watts et al. | |
| 6,279,119 B1 * | 8/2001 | Bissett et al. | 714/12 |
| 6,473,869 B2 * | 10/2002 | Bissett et al. | 714/12 |
| 6,684,278 B1 | 1/2004 | Sakugawa et al. | |
| 2004/0133816 A1 * | 7/2004 | Miyairi et al. | 713/300 |

OTHER PUBLICATIONS

Carroll, Mark et al.; Intel ties upcoming PC-on-a-chip to Rambus; EE Times Online; www.eet.com; May 28, 1999; pp. 1-5.
Wade, Will; Intel delays Timna after finding glitch in Rambus component; EE Times Online; www.eet.com; Jun. 6, 2000; pp. 1-3.
Lammers, David; Intel drops Timna integrated CPU project; EE Times Online; www.eet.com; Sep. 29, 2000; pp. 1-4.

* cited by examiner

*Primary Examiner* — Corey S Faherty
(74) *Attorney, Agent, or Firm* — Faegre Baker Daniels

(57) ABSTRACT

An integrated circuit also referred to as an integrated computing system has a single substrate that has either deposited thereon or etched thereon, a central processing unit, a north bridge, a south bridge, and a graphics controller. An internal bus is coupled between the north bridge and the central processing unit. The central processing unit and north bridge do not require interfaces to perform bus protocol conversions.

9 Claims, 5 Drawing Sheets

COMPUTING SYSTEM HAVING CPU AND BRIDGE OPERATING USING CPU FREQUENCY

RELATED CO-PENDING APPLICATIONS

This application is a continuation of U.S. application Ser. No. 09/471,877, filed Dec. 23, 1999, entitled "METHOD OF INTEGRATING A PERSONAL COMPUTING SYSTEM AND APPARATUS THEREOF", having as inventors Adrian Sfarti et al., owned by instant assignee and is incorporated herein by reference

TECHNICAL FIELD OF THE INVENTION

This invention relates generally to computers and more specifically to integrated computer architectures.

BACKGROUND OF THE INVENTION

FIG. 1 illustrates a schematic block diagram of an architecture of a known computing system 10. The computing system 10 includes a central processing unit 12 integrated circuit, a North bridge 14 integrated circuit, system memory 16, a video graphics processor 18, and a South bridge 22 integrated circuit. The video graphics processor 18 includes a memory controller 54 that interfaces with a frame buffer 20. The video graphics processor 18 utilizes the frame buffer 20 to store processed pixel information for subsequent display.

The central processing unit 12 integrated circuit includes a CPU core logic 24, local cache 26, a phase lock loop 28, an interface 30, a driver 34, and a receiver 36. The driver 34 and receiver 36 are operably coupled to bus 13, which enables the central processing unit 12 to interface with the North bridge 14. The data transceived over bus 13 is done in accordance with a bus protocol. For example, a bus protocol may be DEC Alpha protocol. For a 64 bit bus, 234 pins are required on the central processing unit 12 integrated circuit and a corresponding number are required on the North bridge 14 integrated circuit. The speed at which data is transceived over bus 13 is limited by circuit board technology and in particular by the trace sizes that have a resistance and parasitic inductance and capacitance. As such, current technology enables data to be transceived between the CPU 12 and the North bridge 14 at a rate of about 200 MHz per second.

Internally, the central processing unit 12 utilizes a native bus protocol that allows the central processing unit core 24 to interface with the local cache 26 and the interface 30 at rates from 500 MHz per second to 1,000 MHz per second. In order for the central processing unit 12 to prepare data for transmission on bus 13, the interface 30 must convert the CPUs native bus protocol into the bus protocol. The interface 30 includes a first-in, first-out buffer (FIFO) 32 that is sandwiched between a core interface and a bus interface. The bus interface retrieves data from the FIFO at a rate, and in a format, corresponding to the bus protocol and the core interface retrieves data from the FIFO at a rate, and in a format, corresponding to the native bus protocol. As such, the interface 30 provides the conversion between the CPU native bus protocol and the bus protocol of bus 13.

The North bridge 14 integrated circuit includes a driver 50, a receiver 52, an interface 46, and a North bridge core logic 38. The North bridge core logic 38 includes a memory controller 40 for interfacing with system memory 16, a PCI interface 42 and an AGP (accelerated graphics port) interface 44. The AGP interface 44 enables the video graphics processor 18 to interface with system memory 16. The PCI interface 42 couples the South bridge 22 integrated circuit to the North bridge 14 via a PCI bus. The PCI bus may be a 32 bit bus thereby requiring 100 pins for connection. The AGP interface has about 100 pins and operates at 133-266 Mhz.

The driver 50 and receiver 52 within North bridge 14 perform a similar function as driver 34 and receiver 36. As such, the driver 50 and receiver 52 provide an interface with bus 13 for the North bridge 14. In essence, the drivers 34 and 50 provide the power needed to appropriately transmit the data between the central processing unit 12 and North bridge 14. Conversely, the receivers 36 and 52 include amplifiers to ensure that the data received is of appropriate digital levels.

The interface 46 performs a similar function as interface 30 by converting the bus protocol for bus 13 into a North bridge native bus protocol. Typically, the North bridge bus protocol will be that required by the system memory 16. As such, for data to be transceived between the central processing unit 12 and the North bridge 14, the data must undergo two bus protocol conversions, one from the CPU native bus protocol to the bus protocol of bus 13 and then from the bus protocol of bus 13 to the North bridge native bus protocol, which typically runs at a much lower rate than the rate of bus 13. In addition, the drivers 34 and 50 and receivers 36 and 52 require a substantial amount of power to adequately drive the bus to ensure that appropriate levels of signals are being transceived. Note that the bus protocol also costs logic gates and operational cycles.

The South bridge 22 integrated circuit includes an arbitration module 56, a USB (universal serial bus) interface 58, an ACPI module 60, a low pin count interface module 62, a PCI bridge 64, and a disk interface 66. The arbitration module 56 arbitrates between the other modules as to which module gains access to the PCI bus. The USB interface 58 provides coupling for up to four USB ports. The ACPI module 60 performs power management for the computing system. The low pin count interface 62 enables a mouse, keyboard, trackball, etc. to interface with the computing system 10. The PCI bridge 64 allows plug-in cards to interface with the computing system 10. Such plug-in cards may include an internet connection, a PC card, audio circuitry, a second graphics controller, etc. The disk interface 66, sometimes referred to as an IDE interface, allows disk drives to interface with the computing system 10. The South bridge 22 integrated circuit includes 328 pins for enabling the input/output interfaces with the computer system 10.

Currently, the central processing unit 12, the North bridge 14, the South bridge 22 and a video graphics processor 18, are fabricated as separate integrated circuits. This is primarily due to the complexity of the circuitry, which requires a substantial die size, and due to the limitations of current IC manufacturing techniques. Integration of less powerful computing systems have been achieved. For example, microcontrollers include an integration of a processor with a memory interface. However, the power of the processor is substantially less than the central processing unit 12. As such, microcontrollers are used in devices that require a specific processing function and a limited amount of processing resources. Such devices include home appliances, test equipment, etc. Microcomputers are also known to be integrated on a single integrated circuit. Such microcomputers include even less processing power than a microcontroller and provide a very simplistic computing system in comparison to the system 10 of FIG. 1.

Therefore, a need exists for a method of integrating a personal computing system and apparatus thereof that integrates a central processing unit with a North bridge, that allows the elimination of the interfacing bus, the corresponding drivers and receivers, and the pin count without loss of processing power as would result in a current microcontroller and/or microcomputer.

BRIEF DESCRIPTION OF THE DRAWINGS

The present invention and the associated advantages and features thereof, will become better understood and appreciated upon review of the following detailed description of the invention, taken in conjunction with the following drawings, where like numerals represent like elements, in which.

DETAILED DESCRIPTION OF A PREFERRED EMBODIMENT

Generally, the present invention provides a method of integrating a personal computing system and apparatus thereof. The method and apparatus include processing that begins by integrating a central processing unit with a North bridge on a single substrate such that the central processing unit is directly coupled to the North bridge via an internal bus. The processing then continues by providing memory access requests from the central processing unit to the North bridge at a rate of the central processing unit. The processing continues by having the North bridge buffer the memory access request and subsequently process the memory access requests at a rate of the memory. The method may be expanded by integrating a South bridge onto the same substrate as well as integrating system memory onto the same substrate. With such a method and apparatus integration of the central processing unit with the North bridge eliminates the need for an interfacing bus, the corresponding drivers and receivers, and the corresponding interface units that provide bus protocol conversions.

Figure 2:
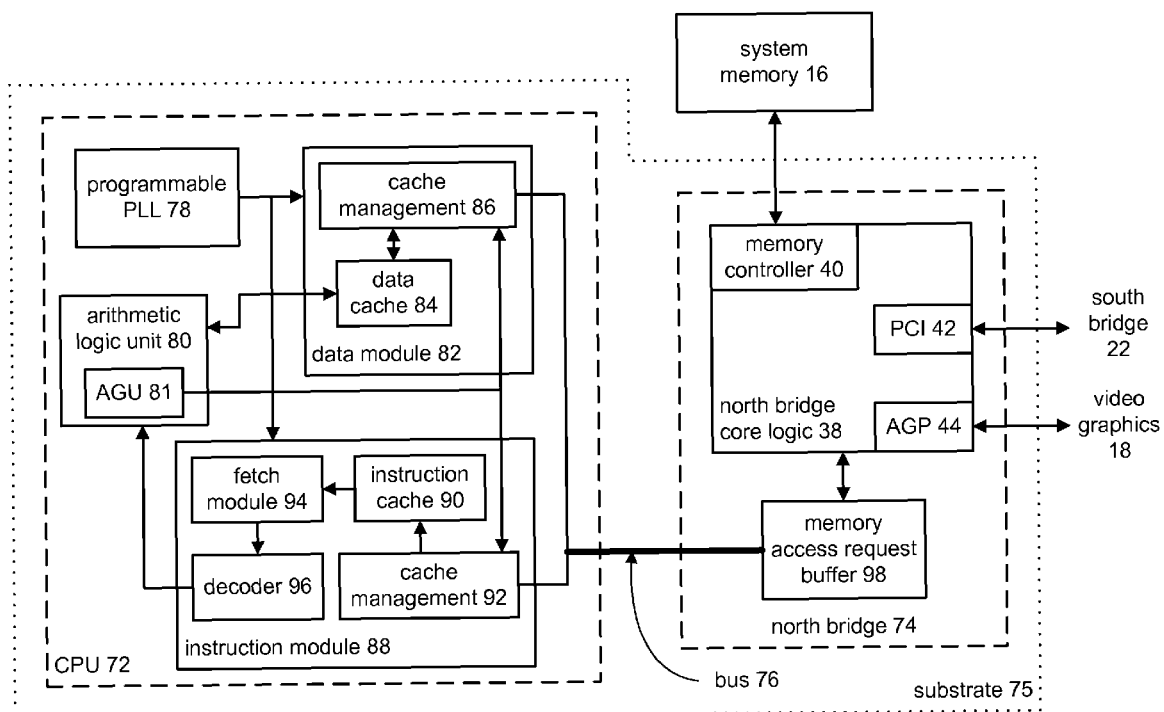
FIG. 2 illustrates a schematic block diagram of an integrated central processing unit and North bridge in accordance with the present invention.

The present invention can be more fully described with reference to FIGS. 2 through 6. FIG. 2 illustrates a schematic block diagram of an integrated computing system 70. The integrated computing system 70 includes a central processing unit 72 module and a North bridge model 74. The central processing unit module 72 is operably coupled to the North bridge module 74 via an internal bus 76. The internal bus 76 includes a data portion, control portion, and address portion. For example, the data may be a 64 bit, 128 bit, or 256 bit bus. The control bus and instruction bus would be sized in accordance with the size of the data bus. In addition, the bus 76 would use a common bus protocol for the central processing unit 72 and North bridge 74. As such, the central processing unit 72 and North bridge 74 do not require the interfaces to perform bus protocol conversions. In addition, the central processing unit 72 and the North bridge 74 do not require the drivers and receivers to transceive data over bus 76. Accordingly, data may be transceived over the bus 76 at much higher rates than in a non-integrated system. For example, the data may be transceived over bus 76 at a rate of 500 megabits per second up to 1,000 megabits per second. Accordingly, the bus protocol for bus 76 may be the native protocol for the CPU 72. Note that if the integrated computing system 70 includes multiple central processing units, a bus protocol would be required for arbitrating access to bus 76 for the central processing units but would still be at a rate corresponding to the native bus protocol of the central processing units.

As shown, the central processing unit 72 and North bridge 74 are deposited, and/or etched, on the same substrate 75. The central processing unit 72 includes a programmable phase lock loop module 78, a data module 82, an arithmetic logic unit 80, and an instruction module 88. The data module 82 includes a data cache 84 and a cache management module 86. The instruction module 88 includes a cache management module 92, an instruction cache 90, a fetch module 94, and an instruction decoder 96. The arithmetic logic unit 80 includes an address generation unit 81.

The programmable phase lock loop 78 sets the operating rate for the central processing unit 72. Such operating rates may range from 500 megahertz to 1,000 megahertz. The data module 82 operates at the operating rate of the central processing unit to transceive data between the arithmetic logic unit 80 and the North bridge 74.

Similarly, the instruction module 88 transceives instructions, i.e., operational codes, from between the arithmetic logic unit 80 and the North bridge 74.

Figure 1:
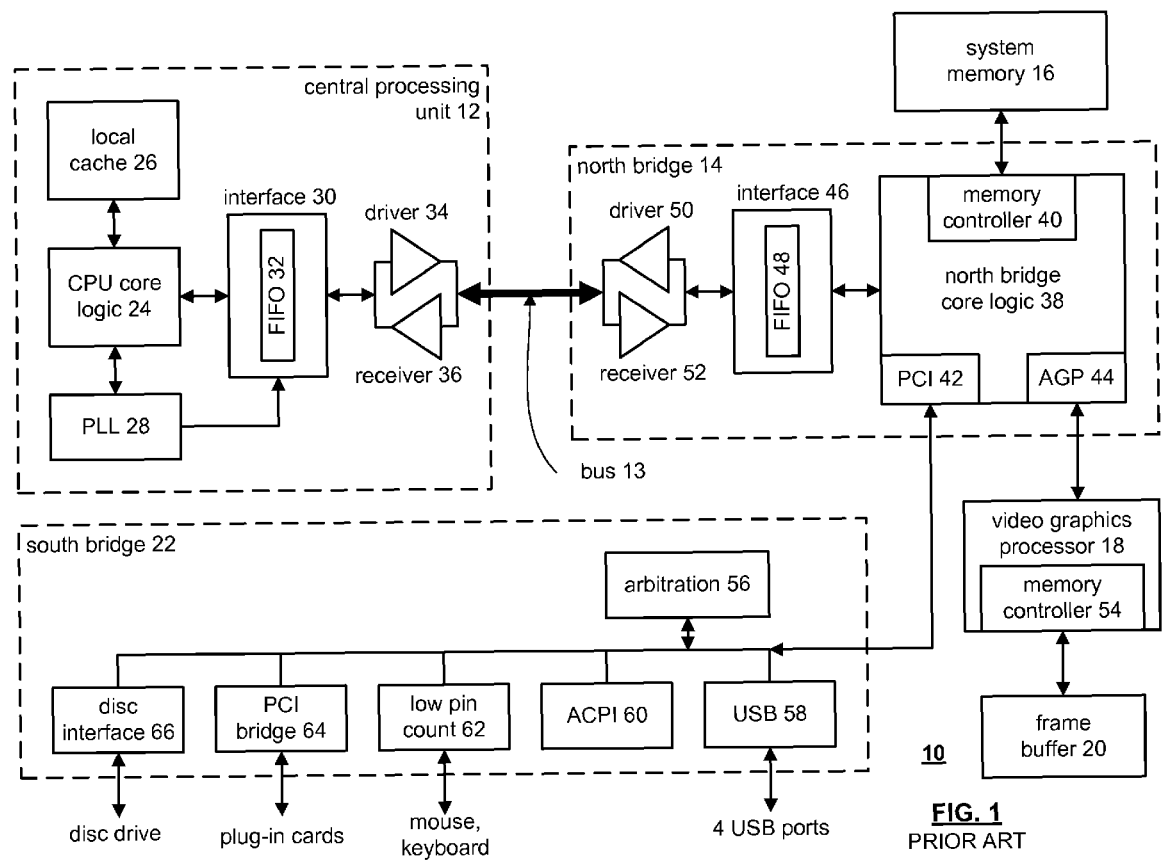
FIG. 1 illustrates a schematic block diagram of a prior art computing system.

The North bridge 74 includes a memory access requests buffer 98, and a North bridge core logic 38. The North bridge core logic is similar to that found in the prior art system of FIG. 1. The memory access requests buffer 98 is operably coupled to bus 76 to buffer transactions, i.e., memory access transactions, from the central processing unit 72. The buffered memory access requests are then provided to the North bridge core logic 38 which subsequently retrieves the corresponding information from system memory 16. Note that by eliminating the bus protocol conversions, the North bridge core logic 38 may interface with the system memory at a much higher rate than in prior art systems. For example, prior art systems would allow access up to 100 megabytes per second, with the current implementation as shown in FIG. 2, the rate may be up to 200 to 300 megabytes per second.

The North bridge core logic 38 may further include an address translation unit that translates the memory access request of the central processing unit from the virtual address space used by the central processing unit to the physical address space of system memory 16. Note that if the central processing unit utilizes the physical address space for its addressing protocol, the address translation unit would not be required.

To further improve the performance, the system memory 16 may be integrated with the central processing unit 72 and North bridge 74 on substrate 75. Further integration may include integrating the South bridge 22 on the substrate 75 as well as integrating the video graphics circuit 18 onto substrate 75. Note that when the South bridge 22 is integrated on the substrate 75 the resulting pin count of the integrated circuit 70 is of approximately the same number as the prior art central processing unit and North bridge pin count. This results because the 100 pins used for the PCI bus are eliminated by integrating the South bridge with the North bridge and the 234 pins required for the bus coupling the central processing unit and North bridge have been eliminated. As such integrating the South bridge, and its 328 pins, into the package that would house substrate 75, is essentially the same as a stand alone central processing unit integrated circuit and a stand alone North bridge integrated circuit. Eliminating AGP eliminates about 100 pins and allows a faster communication between the graphics processor and memory and between the graphics processor and the CPU. Texture requests no longer get passed over the AGP bus but get sent directly to memory. Eliminating the memory interface eliminates about 100 pins per each memory channel.

Figure 3:
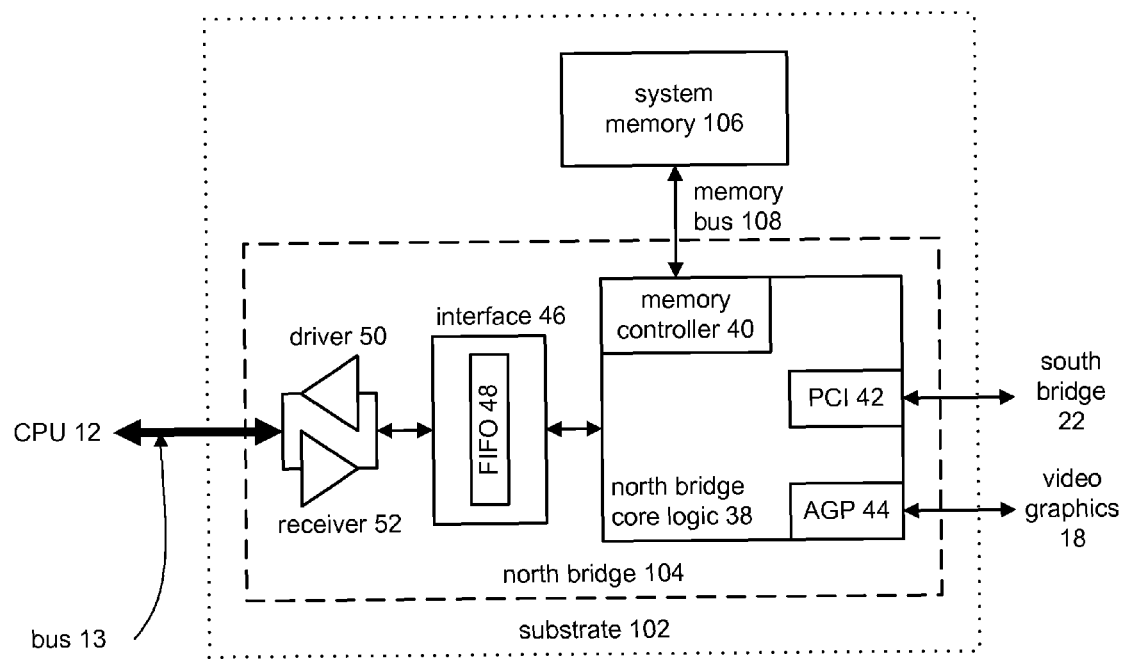
FIG. 3 illustrates a schematic block diagram of an integrated system memory with a North bridge in accordance with the present invention.

FIG. 3 illustrates a schematic block diagram of an alternate integrated personal computing system 100. The integrated personal computing system 100 includes a North bridge 104 and system memory 106 integrated on a substrate 102. The system memory 106 is operably coupled to the North bridge 104 via a memory bus 108. By eliminating the need for an external bus between the system memory and North bridge, the data may be transceived between the system memory at rates much higher than in prior art embodiments. For example, the data may be transceived at rates of 500 megabits per second and greater.

The North bridge 104 is shown to include driver 50, receiver 52, interface 46 and the North bridge core of logic 38. As shown, the North bridge 104 couples to a stand alone central processing unit 12 integrated circuit, a stand alone South bridge integrated circuit 22 and a stand alone video graphics circuit 18. Note that if the central processing unit 12 is integrated onto substrate 102, the driver 50, receiver 52 and interface 46 are removed. As such, the internal bus between the central processing unit and North bridge 104 may operate at the same rate as the memory bus 108.

Figure 4:
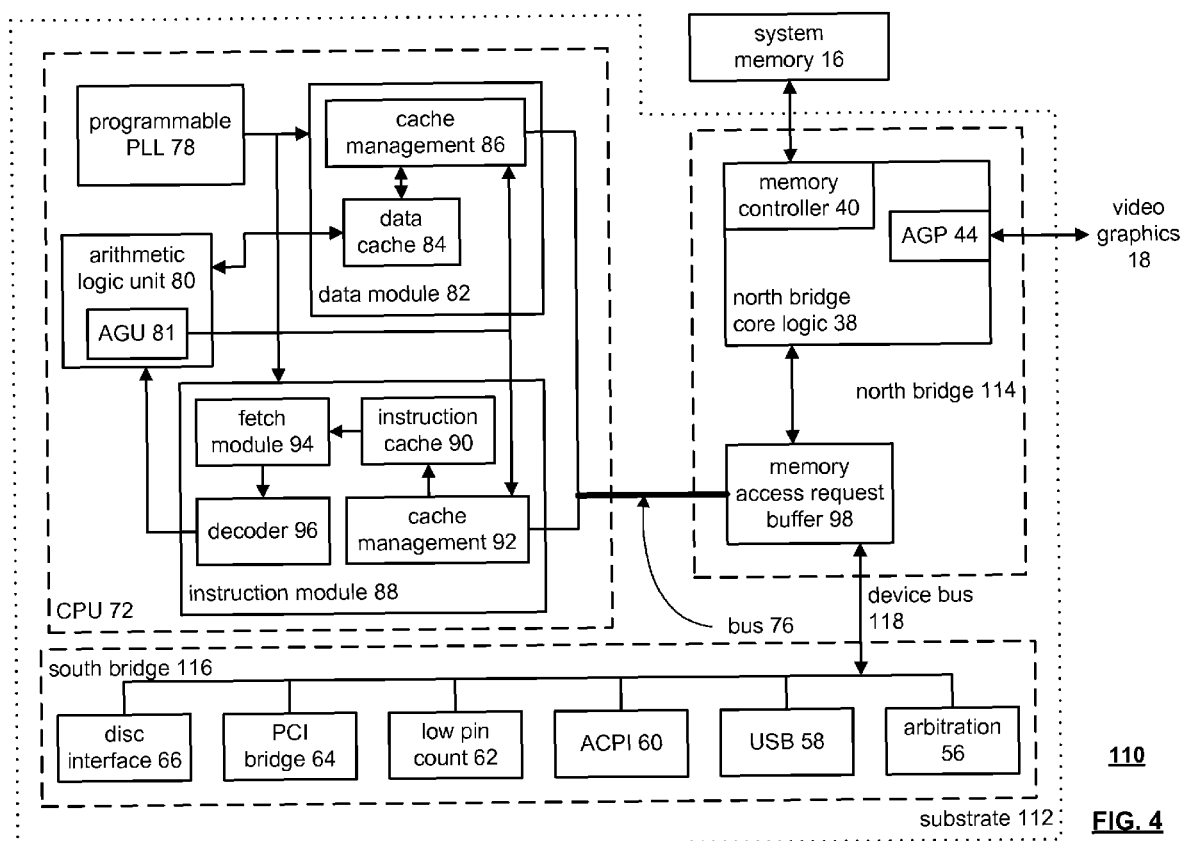
FIG. 4 illustrates a schematic block diagram of integration of a central processing unit, North bridge and South bridge in accordance with the present invention.

FIG. 4 illustrates a schematic block diagram of an integrated computing system 110. As shown, the integrated personal computing system 110 includes the central processing unit 72, a North bridge 114, and a South bridge 116 integrated onto a single substrate 112. The North bridge 114 is operably coupled to the South bridge 116 via an internal device bus 118. The central processing unit 72 is coupled to the North bridge 114 via bus 76 and to the South bridge 116 for power management and interrupt processing. The central processing unit 72 includes the components as shown and discussed with reference to FIG. 2.

The South bridge 116 includes the arbitration module 56, the USB interface 58, the ACPI module 60, the low pin count interface 62, the PCI bridge 64, and the disk interface 66. These modules of the South bridge interface with external devices as described with reference to FIG. 1. By integrating the South bridge 116 with the North bridge 114, the need for the PCI bus has been eliminated thus eliminating 100 pin count from the South bridge and 100 pin count from the North bridge stand alone devices. In addition, the device bus 118 may operate at a much higher rate than the PCI bus. The memory access requests from the South bridge are buffered within the memory access buffer 98 along with memory accesses from the central processing unit 72. The memory access requests are processed by the North bridge core logic 38 such that the appropriate information is stored and/or retrieved from system memory 16. Note that if the video graphics card were also integrated on the substrate, the frame buffer could be included in the system memory 16, and the AGP interface 44 would be eliminated.

Figure 5:
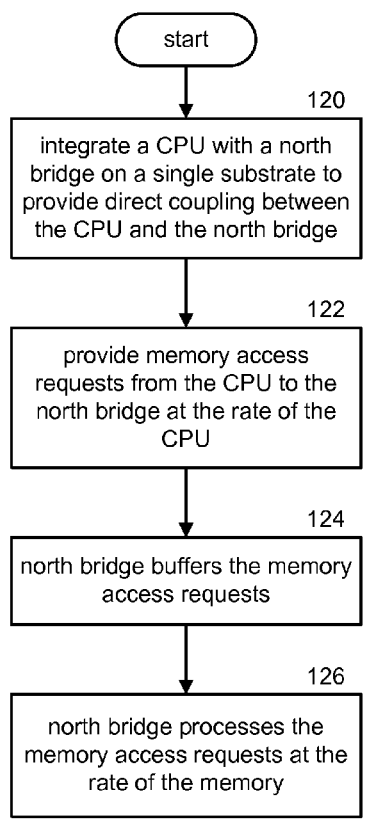
FIG. 5 illustrates a logic diagram of a method for integrating a central processing unit with a North bridge in accordance with the present invention.

FIG. 5 illustrates a logic diagram of a method for integrating a personal computing system. Such a method may be used to manufacture an integrated computing system and/or use of such an integrated computing system. Further, the method may be used as a design tool for producing an integrated computing system. The method begins at step 120 where a central processing unit is integrated with a North bridge onto a single substrate. The central processing unit is directly coupled with the North bridge thereby eliminating the need for bus protocol conversions and drivers and receivers. The process then proceeds to step 122 where memory access requests are provided from the central processing unit to the North bridge at the rate of the central processing unit. Note that the integration of the central processing unit with the North bridge may further include integration of memory onto the substrate, integration of the graphics controller onto the substrate, and integration of the South bridge onto the substrate. The memory access requests to the graphics controller and to the South bridge would be treated similarly to memory access requests from the central processing unit which is discussed below. The process then proceeds to step 124 where the North bridge buffers memory access requests from the central processing unit. The North bridge would also buffer memory access requests if the video graphics circuit, and/or South bridge were integrated on the same substrate. The process then proceeds to step 126 where the North bridge processes the memory access requests at the rate of the memory.

When the graphics controller is integrated, memory access request for the graphics controller would be accomplished by the graphics controller providing memory access requests for graphics data to the north bridge at a rate of the graphics controller. The north bridge buffers the memory access requests and processes them at the rate of the memory. Once the memory access requests are processed, the appropriate memory is accessed. In addition, the north bridge, upon receiving a AGP memory access request would bypass it and transform it into a memory access request.

Figure 6:
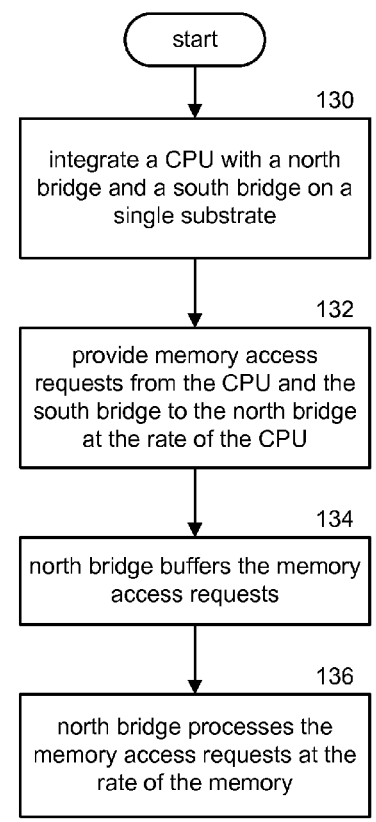
FIG. 6 illustrates a logic diagram of method for integrating a central processing unit, North bridge and South bridge in accordance with the present invention

FIG. 6 illustrates a logic diagram of an alternate method for integrating a personal computing system. The process begins at step 130 where a central processing unit is integrated with a North bridge and a South bridge onto a single substrate. The process then proceeds to step 132 where memory access requests provided from the central processing unit and South bridge are provided to the North bridge at the rate of the central processing unit. The process then proceeds to step 134 where the North bridge buffers the memory access requests. The process then proceeds to step 136 where the North bridge processes the memory access requests at the rate of the memory.

The preceding discussion has presented a method and apparatus for integrating a personal computing system, which may be obtained by using 0.18 micron technology. By utilizing the teaches of the present invention, an integrated computing system may be obtained that improves the processing speed of memory access requests between the central processing unit and North bridge. In addition, power consumption is reduced as well as board complexity for mother board manufacturers is reduced. As one of average skill in the art would appreciate, other embodiments may be derived from the teachings of the present invention without deviating from the scope of the claims.

The above detailed description of the present invention and the examples described therein have been presented for the purposes of illustration and description. It is therefore contemplated that the present invention cover any and all modifications, variations and equivalents that fall within the spirit and scope of the basic underlying principles disclosed and claimed herein.

What is claimed is:

1. An integrated computing system comprising:
   a central processing unit etched on a single substrate;
   north bridge operably coupled to the central processing unit, and etched on the single substrate, wherein the north bridge includes a memory access request buffer interoperably coupled with a memory controller, wherein the memory access request buffer receives the memory access request from the central processing unit at an operating clock rate of the central processing unit;

a bus operably coupled to the central processing unit and the north bridge and contained on the single substrate, wherein the bus provides a transport medium for memory access requests and corresponding memory responses between the central processing unit and the north bridge at an operating clock rate of the central processing unit;

south bridge that is etched on the single substrate, wherein the south bridge provides an interface between at least one external device and the north bridge;

a device bus that is contained on the substrate, wherein the device bus couples the north bridge to the south bridge; and a graphics controller that is etched on the substrate, wherein the graphics controller includes a frame buffer controller for processing data transferences between the graphics controller and a frame buffer and wherein the graphics controller issues a graphics memory access request to the north bridge.

2. An integrated computing system comprising:

a central processing unit deposited on a single substrate;

north bridge operably coupled to the central processing unit, and deposited on the single substrate, wherein the north bridge includes a memory access request buffer interoperably coupled with a memory controller, wherein the memory access request buffer receives the memory access request from the central processing unit at an operating clock rate of the central processing unit;

a bus operably coupled to the central processing unit and the north bridge and contained on the single substrate, wherein the bus provides a transport medium for memory access requests and corresponding memory responses between the central processing unit and the north bridge at an operating clock rate of the central processing unit;

south bridge that is deposited on the single substrate, wherein the south bridge provides an interface between at least one external device and the north bridge;

a device bus that is contained on the substrate, wherein the device bus couples the north bridge to the south bridge; and a graphics controller that is deposited on the substrate, wherein the graphics controller includes a frame buffer controller for processing data transferences between the graphics controller and a frame buffer and wherein the graphics controller issues a graphics memory access request to the north bridge.

3. An integrated computing system comprises:

a central processing unit operable to execute operational instructions, wherein the central processing unit includes an arithmetic logic unit interoperably coupled with a data module, an instruction module, and a programmable phase locked loop that provides an operating clock rate for the central processing unit, wherein the central processing unit issues a memory access request when information relating to executing one of the operational instructions is not stored within the data module or the instruction module, and wherein the central processing unit is etched on a single substrate;

north bridge operably coupled to interface with memory at a memory rate, wherein the north bridge includes a memory access request buffer interoperably coupled with a memory controller, wherein the memory access request buffer receives the memory access request from the central processing unit at the operating clock rate of the central processing unit, wherein the memory controller retrieves the memory access request from the memory access request buffer at the memory rate, wherein the memory controller processes the memory access request to produce a memory response that includes the information, and wherein the north bridge is etched on the substrate; and a bus, contained on the substrate, operably coupled to the central processing unit and the north bridge, wherein the bus provides a transport medium for memory access requests and corresponding memory responses between the central processing unit and the north bridge at the operating clock rate of the central processing unit.

4. The integrated computing system of claim 3, wherein the data module further comprises operable coupling to a data portion of the bus, wherein the data module provides data memory access requests via the data portion of the bus to the north bridge and wherein the memory access request buffer further comprises a data portion operably coupled to receive the data memory access requests from the data portion of the bus.

5. The integrated computing system of claim 3, wherein the instruction module further comprises operable coupling to an instruction portion of the bus, wherein the instruction module provides instruction memory access requests via the instruction portion of the bus to the north bridge and wherein the memory access request buffer further comprises an instruction portion operably coupled to receive the instruction memory access requests from the instruction portion of the bus.

6. The integrated computing system of claim 3, wherein the central processing unit further comprises an address generation unit that generates the memory access request to include an address in physical memory space.

7. The integrated computing system of claim 3 further comprises:
    a memory bus that is contained on the substrate, wherein the memory bus couples the north bridge to the memory, and wherein the memory is contained on the substrate.

8. The integrated computing system of claim 3 further comprises:
    a device bus that is contained on the substrate, wherein the device bus couples the north bridge to south bridge that is contained on the substrate.

9. The integrated computing system of claim 3 further comprises: a graphics controller that is contained on the substrate, wherein the graphics controller includes a frame buffer controller for processing data transferences between the graphics controller and a frame buffer and wherein the graphics controller issues a graphics memory access request to the north bridge.

* * * * *